(12) United States Patent
Machida et al.

(10) Patent No.: US 6,546,915 B2
(45) Date of Patent: Apr. 15, 2003

(54) FUEL INJECTION CONTROL APPARATUS (75) Inventors: Kenichi Machida, Saitama (JP); Tatsuo Hayashi, Saitama (JP); Masahiko Abe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/951,416

(22) Filed: Sep. 14, 2001

(65) Prior Publication Data

US 2002/0029764 A1 Mar. 14, 2002

(30) Foreign Application Priority Data

Sep. 14, 2000 (JP) .................................... 2000-280509
Jun. 19, 2001 (JP) .................................... 2001-185017

(51) Int. Cl.$^7$ .............................................. F02D 41/14
(52) U.S. Cl. ........................ 123/478; 123/488; 701/105
(58) Field of Search ................................ 123/295, 435, 123/436, 445, 448, 478, 488, 480, 491, 492, 493; 701/103, 104, 105, 110, 113, 115

(56) References Cited

U.S. PATENT DOCUMENTS 4,986,244 A * 1/1991 Kobayashi et al. ......... 123/488
5,427,083 A * 6/1995 Ahern ........................ 123/676

FOREIGN PATENT DOCUMENTS

| JP | 361265340 | * 11/1986 | ........... F02D/41/34 |
| JP | A1280646 | 11/1989 | |
| JP | 325351 | * 12/1998 | ........... F02D/41/34 |
| JP | 161786 | * 6/2002 | ........... F02D/41/14 |

* cited by examiner

Primary Examiner—Tony M. Argenbright
Assistant Examiner—Hai Huynh
(74) Attorney, Agent, or Firm—Birch, Stewart, Kolasch & Birch, LLP (57) ABSTRACT To enable accurate detection of the alternative ambient pressure when the correction of fuel supply is carried out by the used of the value of the ambient pressure substituted by the negative pressure in the inlet pipe. The difference between the calculated alternative ambient pressure and the estimated ambient pressure (offset) is set as a plurality of functions of the number of engine revolutions and the throttle opening, and stored in the area determination section with a plurality of areas divided by each offset value. In which area the condition of the engine resides is determined from the number of engine revolution and the throttle opening and the offset corresponding to the area is supplied. The calculation section calculates the calculation base value by the use of the negative pressure PB and the offset.

20 Claims, 8 Drawing Sheets

FIG. 12

FUEL INJECTION CONTROL APPARATUS

CROSS-REFERENCE TO RELATED APPLICATIONS

The present application claims priority under 35 USC 119 to Japanese Patent Application Nos. 2000-280509 filed on Sep. 14, 2000 and 2001-185017 filed on Jun. 19, 2001, the entire contents thereof are hereby incorporated by reference.

BACKGROUND OF THE INVENTION

1. Field of the Invention

The present invention relates to a fuel injection control apparatus, and more specifically, to a fuel injection control apparatus that can determine the amount of fuel injection considering the ambient pressure without using an ambient pressure sensor.

2. Description of the Background Art

When fuel is supplied to the engine by the use of a fuel injection system, an appropriate amount of fuel injection is determined by accurately detecting the operating condition of the engine from the number of engine revolutions, the throttle opening, the negative pressure in the inlet pipe, and the engine cooling water temperature. In order to detect the condition of the engine more accurately, it is often required to detect the ambient pressure separately from the negative pressure in the inlet pipe. However, there are a number of sensors that are integrated in the engine in many cases in order to grasp the operating condition of the engine, and thus it is not preferable to increase the number of the sensor. When a large number of sensors are provided, the construction around the engine becomes complicated. Therefore, free space decreases, and accordingly, the possibility of design is lowered and the cost of production increases. Therefore, it is desirable to develop a method of determining the amount of injection to be supplied without using an ambient pressure sensor.

A fuel control apparatus for complying with this requirement is proposed in Japanese Unexamined Patent Application Publication No. 1-280646. Generally, in the area where the throttle opening is large, the ambient pressure and the negative pressure in the inlet pipe are almost the same. Therefore, in a fuel control apparatus stated in this Patent Application Publication, the area where the difference between the ambient pressure and the negative pressure in the inlet pipe is not more than a prescribed value is determined in advance as an alternative ambient pressure calculating area. When the condition of the engine based on the throttle opening and the number of engine revolutions is maintained in a state to represent the alternative ambient pressure calculating area for a prescribed time period, it is recognized that the negative pressure in the inlet pipe is stabilized, and a predetermined offset value is added to the current value of the negative pressure in the inlet pipe to calculate the alternative ambient pressure value.

In the fuel control apparatus of the related art described above, the area in which "the ambient pressure and the negative pressure in the inlet pipe are almost the same" in the high revolution area of the engine is only the area where the throttle opening is large. In other words, in a state in which the engine is rotated at high speed and the throttle valve is opened to a large extent continues for some period of time, it becomes an alternative ambient pressure calculating area in which "the ambient pressure and the negative pressure in the inlet pipe are almost the same."

With this related art applied to a motorbike that is driven with the engine rotated at a high speed, if a state in which the throttle opening is large continues, the alternative ambient pressure is calculated, for example, only when it is accelerated for a relatively long time. Therefore, since the possibility of an occurrence of such a state is low, it is anticipated that the possibility of calculating the alternative ambient pressure is also lowered, and thus it is not expected that the accuracy of the alternative ambient pressure is maintained. In addition, since the offset value is added to the negative value in the inlet pipe is a fixed value, improvement of the accuracy cannot be expected.

In addition, since the alternative ambient pressure is calculated when the throttle opening is large, the accuracy for calculating the alternative ambient pressure is low while driving on the downslope, as a consequent, the accuracy of calculating the amount of fuel injection tends to be lowered.

SUMMARY AND OBJECTS OF THE INVENTION

Accordingly, it is an object of the present invention to solve the above-described problem, and to provide a fuel injection control apparatus in which an accurate amount of fuel injection can be calculated by the alternative ambient pressure value with its accuracy improved.

In order to achieve the object described above, the first feature of the present invention is a fuel injection control apparatus for correcting the basic injection time period calculated from the number of engine revolution and the throttle opening by the correction expression including the value of the ambient pressure to calculate the corrected injection time period, comprising area determination means for determining the division of the area defined as a function of the number of engine revolution and the throttle opening in which the engine condition resides out of a plurality of divisions divided based on the offset value that is the difference between the ambient pressure determined under the reference ambient pressure in advance and the negative pressure in the inlet pipe according to the number of engine revolution and the throttle opening. A calculating means is provided for calculating the base value for calculating the alternative ambient pressure by adding the offset value described above provided for each area determined by the area determination means to the negative pressure in the inlet pipe. Ambient pressure value determination means is provided for determining the base value for calculating the alternative ambient pressure as a value of the ambient pressure when the difference between the last determined value of the ambient pressure and the base value for calculating the alternative ambient pressure is not more than the predetermined value.

According to a first feature, a plurality of offset values each of which is the differences between the ambient pressure and the negative pressure in the inlet pipe are provided so that the offset value corresponding to each area determined by the number of engine revolutions and the throttle opening can be selected and the fuel can be corrected accurately according to the condition of the engine.

A second feature of the present invention is that the ambient pressure value determination means determines the base value for calculating the alternative ambient pressure as an ambient pressure value when the base value for calculating the alternative ambient pressure exceeds the last determined value of the ambient pressure.

According to the second feature, since the base value calculating the alternative ambient pressure is reliably renewed by the ambient pressure value at the time when the base value for calculating the alternative ambient pressure exceeds the last determined value of the ambient pressure, for example, the accurate value of the ambient temperature can be set during traveling on the downslope where the air pressure tends to increase.

The present invention has a third feature in that the ambient pressure value determination means is constructed wherein the maximum value of the base value is determined for calculating the alternative ambient pressure within a predetermined time period from the moment when the last value of the ambient pressure is determined as the ambient pressure value. Since the ambient pressure value is renewed by the maximum value of the base value for calculating the alternative ambient pressure detected within the predetermined time period, for example, the ambient pressure value is prevented from being determined to the value lower than the actual value of the ambient pressure under the influence of the base value for calculating the alternative ambient pressure that tends to be lowered on the upslope.

The fourth feature of the present invention is opening variations detecting means for detecting variation of the throttle opening wherein the ambient pressure value determination means is energized when the variation is within the predetermined value. According to the fourth feature, the accurate ambient pressure value can be obtained since the ambient pressure value is not renewed when the throttle opening is suddenly changed, which may cause instability of the negative pressure in the inlet pipe.

The fifth feature of the present invention is that calculating means that is constructed in such a manner that when the vehicle speed exceeds the predetermined value, the traveling pressure value corresponding to the vehicle speed is calculated to add the ambient pressure value. The sixth feature of the present invention is that storage means for setting the traveling pressure value under the air pressure of 760 mmHg corresponding to the vehicle speed is provided and that the calculating means uses the traveling pressure value read from the storage means according to the vehicle speed. According to the fifth and sixth features, the ambient pressure value can be determined considering the influence of the traveling pressure that emerges when the vehicle speed is high. In addition, the present invention has a seventh feature in that the reference ambient pressure value is an air pressure corresponding to 760 mmHg.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
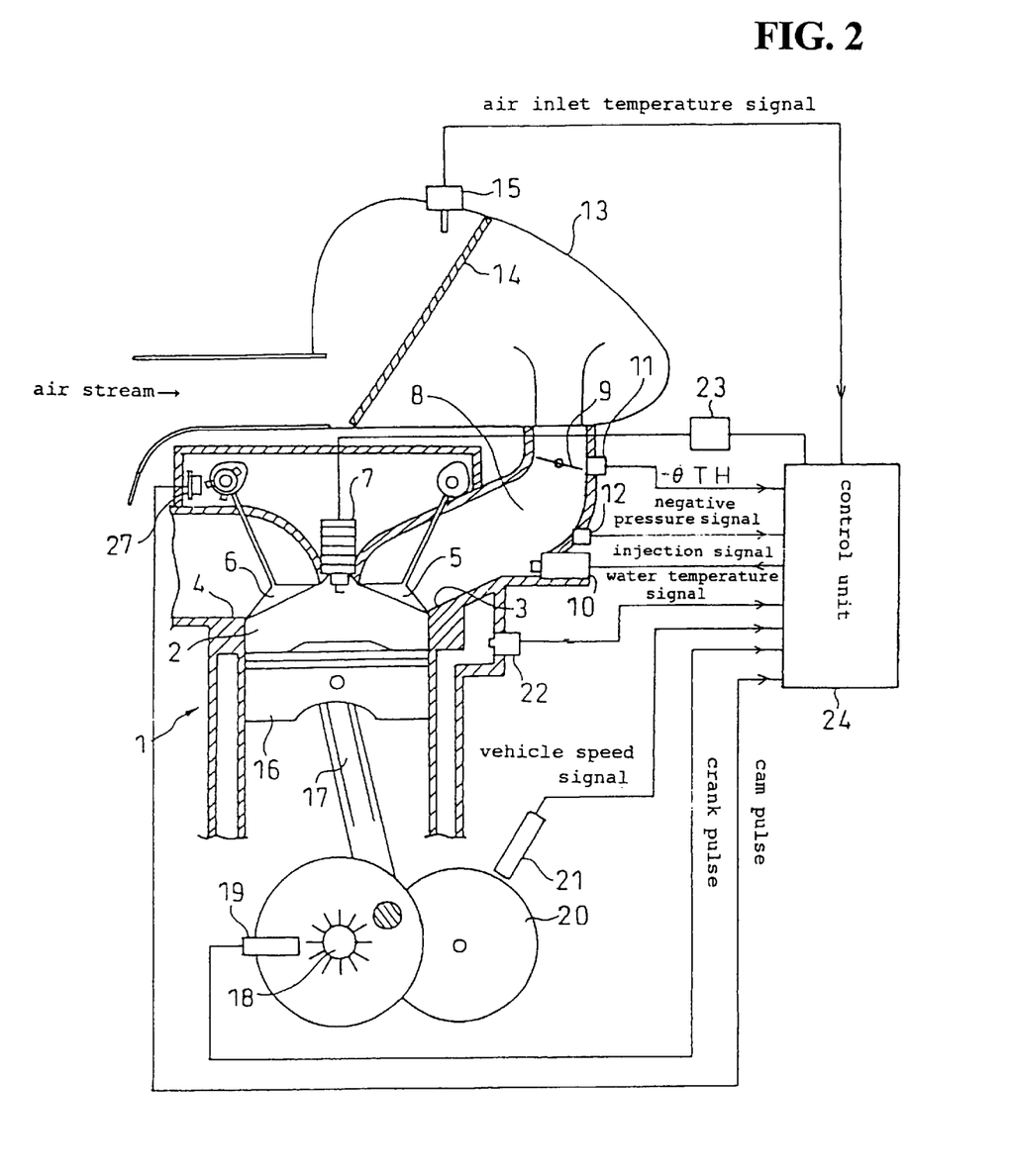
FIG. 2 is a diagram showing a partial cut-away view of a principal portion of an internal combustion engine including the fuel injection control apparatus according to the present invention.

Referring now to the drawings, the present invention will be described. FIG. 2 is a diagram showing a partial cut-away view of the principal portions of the internal engine (engine) integrated with a fuel projection control apparatus according to an embodiment of the present invention. In the FIG. 2, the combustion chamber 2 of the cylinder 1 is formed with an inlet port 3 and an exhaust port 4. The ports 3, 4 are provided with an intake valve 5 and an exhaust valve 6, respectively, and with an ignition plug 7. A cam angle sensor 27 is disposed facing towards a cam 26 for opening and closing the exhaust valve 6 for feeding cam pulses representative of the angle of rotation of the cam 26.

An inlet passage (inlet pipe) 8 is in communication with the inlet port 3 and is provided with a throttle valve 9 for adjusting the amount of intake air according to the opening θTH. A fuel injection valve 10 is provided as well as a throttle sensor 11 for detecting the opening θTH. A negative pressure sensor 12 is provided for detecting the negative pressure in the inlet pipe PB. An air cleaner 13 is provided at the end of the inlet passage 8. The air cleaner 13 is provided with an air filter 14 therein. Air taken through the air intake duct 25 is disposed forwardly of the air cleaner 13 and is drawn through the air filter 14 into the air intake passage 8. In addition, the air inlet temperature sensor 15 is provided in the air cleaner 13.

A piston 16 is provided in the cylinder 1, and a rotation angle sensor 19 that outputs the angle of rotation of the crank and feeds the crank pulse for each predetermined crank angle is disposed facing towards a crankshaft 18 connected to the piston 16 via a connecting rod 17. In addition, a vehicle speed sensor 21 for feeding the vehicle speed signal is disposed facing towards the body of rotation 20 such as a main shaft of the speed changer connected to rotate the crankshaft 18. The water jacket formed around the cylinder 1 is provided with a water temperature sensor 22 for detecting the temperature of the cooling water, which is representative of the engine temperature. The ignition plug 7 is connected with an ignition coil 23.

The control unit 24 is a microcomputer constructed of a CPU and a memory, comprising an interface such as an input/output port, an A/D converter, and the like, that is powered by a battery, which is not shown.

The output of each sensor is fed through the input port into the control unit 24. The drive signal is fed to the fuel injection valve 10 and the ignition plug 7 according to the result of processing based on the input signal from each sensor. The drive signal (injection signal) of the fuel injection valve 10 is a pulse signal having a pulse width according to the amount of injection, and the valve is maintained in a opened state for a time period corresponding to the pulse width and fuel is injected into the inlet passage 8.

The pulse width of the injection signal that determines the amount of the fuel injection, that is, the fuel injection time, is calculated based on the detected value of the throttle sensor 11 (the throttle opening θTH) and the number of engine revolutions Ne. The basic injection time period calculated by the throttle opening θTH and the number of engine revolution Ne is corrected according to the water temperature and the inlet temperature. Especially, in the present invention, the ambient pressure PA determined based on the offset value and the negative pressure in the inlet pipe determined from the number of the revolutions and the throttle opening is used for correction of the basic injection time.

In this embodiment, the ambient pressure PA is determined without using the ambient pressure sensor according to the following procedure. In a first place, the difference between the ambient pressure PA and the negative pressure in the inlet pipe PB (offset value) is set as a function of the number of engine revolution Ne and the throttle opening θTH. The offset value is set using the result of a measurement of the negative pressure in the inlet pipe PB under the ambient pressure PA of 760 mmHg. Under the offset value, a plurality of areas corresponding to the number of engine revolutions Ne and the throttle opening θTH are set.

Figure 3:
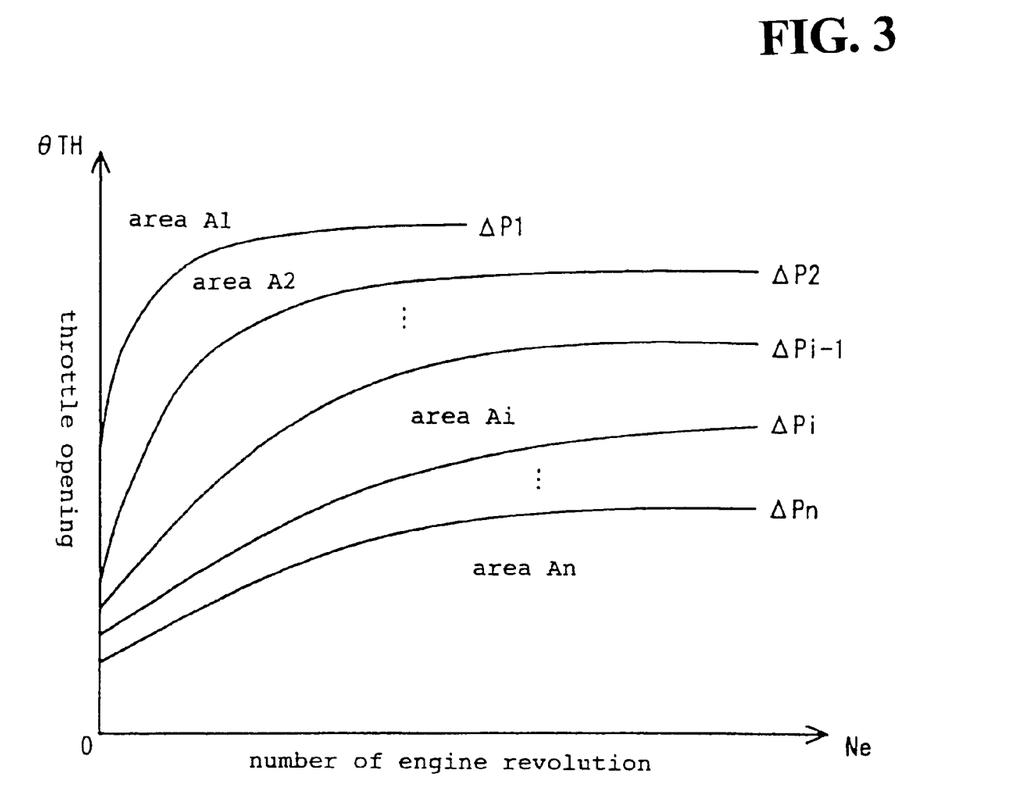
FIG. 3 is a drawing showing offset values of the negative pressure in the inlet pipe and the alternative ambient pressure, and a plurality of areas formed based on the offset values.

FIG. 3 is a drawing showing the offset values corresponding to the number of engine revolution Ne and the throttle opening θTH, and a plurality of areas formed based on the offset values. In the same drawing, the vertical axis represents the throttle opening θTH, and the horizontal axis represents the number of engine revolution Ne. The area A1 is set as an area in which the offset value is below $\Delta P1$, A2 is set as an area in which the offset value is not less than $\Delta P1$ and below $\Delta P2$, and the area Ai is set as an area in which the offset value is not less than $\Delta Pi-1$ and below $\Delta Pi$, and the area An is set as an area in which the offset value is not less than $\Delta Pn-1$ and below $\Delta Pn$, respectively. The offset values are represented by the expression "$\Delta P1 < \Delta P2 < \Delta Pi-1 < \Delta Pi < \Delta Pn$". The relation in this drawing can be stored in the memory as a map.

As a next step, the offset value $\Delta P$ is added to the negative pressure in the inlet pipe PB to calculate a provisional ambient pressure value (hereinafter referred to as "a base value for calculating alternative PA") (PASUB_BASE). For example, in the area Ai, the base value for calculating alternative PA (PASUB_BASE) is calculated by the following expression. The value for calculating alternative PA (PASUB_BASE) =negative pressure in the inlet pipe $$PB + \{(\Delta Pi + \Delta Pi-1)/2\} \times \text{(alternative PA value PASUB} \times 760)$$ Expression 1

In the expression 1, in the term of $\{(\Delta Pi+\Delta Pi-1)/2\}$, the average value of the offset value in the area i is obtained, and in the term of (alternative PA value PASUB×760), the offset value set by the ambient pressure 760 mmHg is corrected based upon the determined alternative ambient pressure value (hereinafter referred to as a "alternative PA value") (PASUB). Here, the alternative PA value PASUB is set with the negative pressure in the inlet pipe PB as an initial value when the ignition is ON, and renewed by the base value for calculating alternative PA (PASUB_BASE), when the difference between the base value for calculating alternative PA (PASUB_BASE) and the alternative PA value (PASUB) is within the predetermined value. The alternative PA value (PASUB) passes as the ambient pressure PA and is used for determining the term of multiplication correction at the time of calculating the fuel injection time.

Since the area A1 and the area An are defined by an offset values $\Delta P1$ or $\Delta Pn$, the expression 1 $\{(\Delta Pi+\Delta Pi-1)/2\}$ is substituted by $\{\Delta P1\}$ in the area A1 and by $\{\Delta Pn\}$ in the area An, being different from other areas.

Referring now to the flow chart, the procedure described above will be described. In the step S1 in FIG. 4, the number of engine revolutions Ne is read in. The number of engine revolution Ne can be obtained by counting the crank pulse output from the rotational angle sensor 19. In the step S2, the output of the throttle sensor 11 is read as a throttle opening θTH. In the step S3, the variation of the throttle opening DθTH is calculated from the throttle openings θTH read last time and this time. In the step S4, the output of the negative pressure sensor 12 is read as a negative pressure in the inlet pipe PB. In the step S5, the vehicle speed signal output from the vehicle speed sensor 21 is read as a vehicle speed (VPLS).

Figure 4:
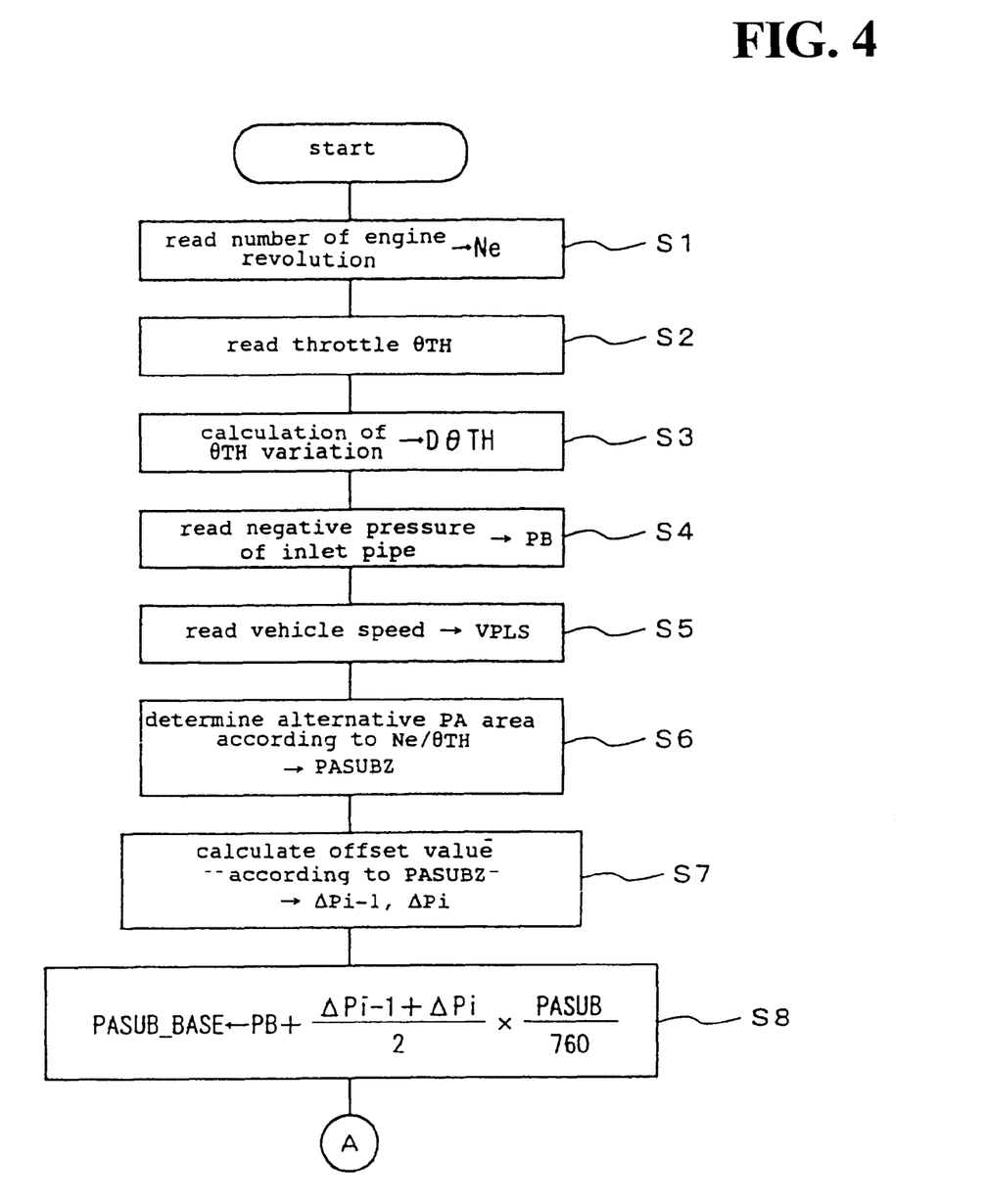
FIG. 4 is a flow chart (No. 1) showing the process of the fuel injection.

In the step S6, referring to data in FIG. 3 stored as a map in advance, the area corresponding to the number of engine revolutions Ne and the throttle opening θTH is determined and set as a parameter (PASUBZ). In step S7, based on the parameter (PASUBZ), the offset value corresponding to the upper limit of the area shown by the parameter (PASUBZ), $\Delta Pi-1$ and the offset value corresponding to the lower limit, $\Delta Pi$ (represented by the area i) are calculated. However, in the area A1 and the area An, only one offset value is obtained. In other words, $\Delta P1$ is obtained in the area A1, and $\Delta Pn$ is obtained in the area An. In the step S8, the base value for calculating the alternative PA (PASUB_BASE) is calculated by the expression 1.

Figure 5:
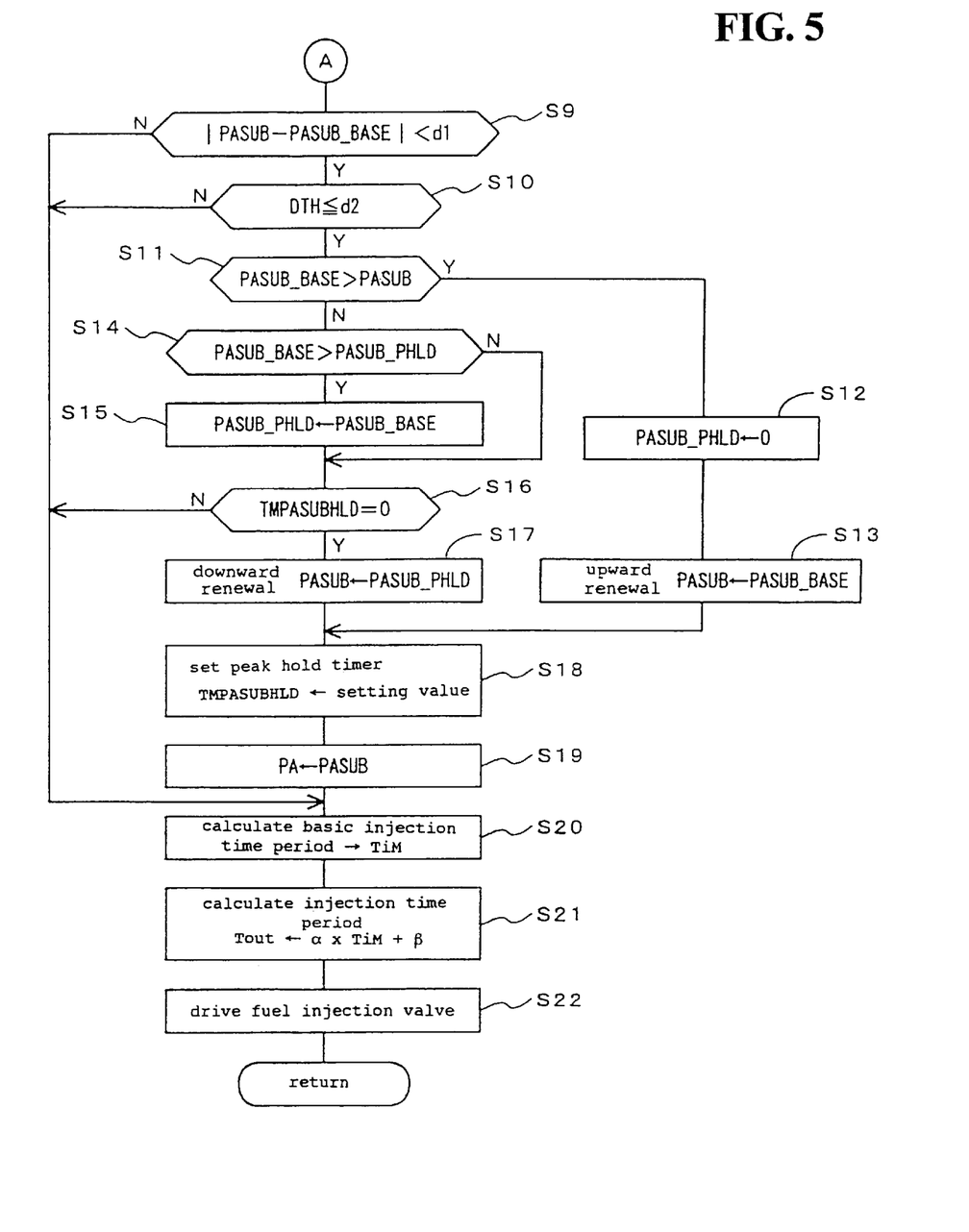
FIG. 5 is a flow chart (No. 2) showing the process of the fuel injection.

In the step S9 in FIG. 5, whether or not the absolute value of the difference between the base value for calculating the alternative PA (PASUB_BASE) and the alternative PA value (PASUB) is below the predetermined value d1 is calculated. If yes in the step S9, the procedure moves to the step S10, and whether or not the variation of the throttle opening DθTH is not more than the predetermined value d2 is determined. It is because the alternative PA value is renewed only when the variation of throttle opening DθTH is small since there is a case where the negative pressure in the inlet pipe PB does not follow the throttle opening θTH when the throttle opening θTH is suddenly changed.

In the step S11, whether or not the base value for calculating the alternative PA (PASUB_BASE), is larger than the alternative PA value (PASUB) is determined. If yes, the procedure moves to the step S12 to clear the peak hold value of the alternative PA value (PASUB) (PASUB_PHLD)(described later), and the alternative PA value (PASUB) is renewed by the base value for calculating the alternative PA (PASUB_BASE) in the step S13. In other words, the alternative PA value (PASUB) is renewed in the upward direction.

On the other hand, when the step S11 is NO, the procedure moves to the step S14 and determines whether or not the base value for calculating the alternative PA (PASUB_is larger than the peak hold value (PASUB_PHLD). When the determination is YES, the procedure moves to the step 15 and sets the base value for calculating the alternative PA (PASUB_BASE) as a peak hold value (PASUB_PHLD). When the step S14 is NO, the step S15 is skipped, and the peak hold value (PASUB_PHLD) is not renewed.

In the step S16, whether or not the timer value (TMPASUBHLD) is "0" is determined. The initial determination in the step S16 is YES, and the procedure moves to the step S17 to renew the alternative PA value (PASUB) by the peak hold value (PASUB_PHLD). In other words, the alternative PA value (PASUB) is renewed in the downward direction. In the step S18, the initial value is set as a timer value (TMPASUBHLD). In the step S19, the alternative PA value is set as an ambient pressure PA used for calculating the amount of fuel injection.

From the above described processing, when the base value for calculating the alternative PA (PASUB_BASE) is larger than the alternative PA value PASUB (supposed to be when traveling on the downslope), the alternative PA value PASUB is renewed by the base value for calculating the alternative PA (PASUB_BASE) immediately when the base value for calculating the alternative PA (PASUB_BASE) and the alternative PA value PASUB are close with respect to each other (Yes in the step S9) and the variation of throttle opening DθTH is small (Yes in the step S10) (the step S13).

In other words, when the vehicle travels on the downslope, the opportunity in which the throttle valve opens to a large extent reduces. Since the negative pressure in the inlet pipe PB is low when the throttle opening θTH is small, the base value for calculating the alternative PA (PASUB_BASE) becomes small, and thus the determination in the step S9 can hardly be YES. In other words, the number of times in which the alternative PA value (PASUB) is renewed is small. Therefore, in this embodiment, considering that "the ambient pressure tends to increase when traveling on the downslope", the alternative PA value (PASUB) is immediately renewed by the base value for calculating the alternative PA (PASUB_BASE), when the base value for calculating the alternative PA (PASUB_BASE) is increased.

On the other hand, when the base value for calculating the alternative PA (PASUB_BASE) is smaller than the alternative PA value (PASUB) (it is supposed to be when traveling on the upslope), the peak hold value (PASUB_PHLD) of the base value for calculating the alternative PA (PASUB_BASE) within the counting time period of the timer value (TMPASUBHLD) is maintained until the timer value (TMPASUBHLD) becomes "0", and when the timer value (TMPASUBHLD) becomes "0" (Yes in the step S16), the alternative PA value (PASUB) is renewed by the peak hold value PASUB_PHLD (the step S17).

Since there may be many opportunities to open the throttle to a large extent when the vehicle is traveling on the upslope, the number of opportunities that the alternative PA value (PASUB) is renewed is much larger than the case of traveling on the downslope. However, when it is traveling on the upsiope, the ambient pressure tends to reduce, and thus the negative pressure in the inlet pipe PB tends to be lowered as well, and thus the frequent renewal of the alternative PA value (PASUB) may cause the alternative PA value (PASUB) to be smaller than the ambient pressure. Therefore, in this embodiment, when it is supposed to be traveling on the upsiope, the alternative PA value (PASUB) is renewed by the peak hold value (PASUB_PHLD) of the base value for calculating the alternative PA (PASUB_BASE) of the time representative of the timer value (TMPASUBHLD).

Now, returning to FIG. 5 in which the amount of the fuel injection (represented by the injection time period) is determined by the use of the PA value, in the step S20, the basic injection time TiM is calculated from the number of rotations of the engine Ne and the throttle opening θTH. The basic injection time TiM can be calculated from the map which is predetermined with the number of engine revolutions Ne and the throttle opening θTH as parameters.

In the step S21, the correction term is multiplied and added to the basic injection time period TiM by the use of the following expression: Injection time period $$Tout = \alpha \times TiM + \beta \qquad \text{Expression 2,}$$

to calculate the injection time period Tout. The correction term for multiplication α is determined by the water temperature detected by the water temperature sensor 22, the inlet air temperature detected by the inlet air temperature sensor 15, and the ambient pressure PA, and the correction term β for addition includes the amount of correction in acceleration determined by the variation of the throttle opening DθTH and the invalid injection time period that is a feature of the fuel injection valve 10.

In Step S22, the drive signal of the fuel injection valve 10 is fed for the fuel injection time period Ti. The fuel injection valve 10 is opened while the drive signal is being supplied, and fuel is injected into the inlet passage 8.

Figure 10:
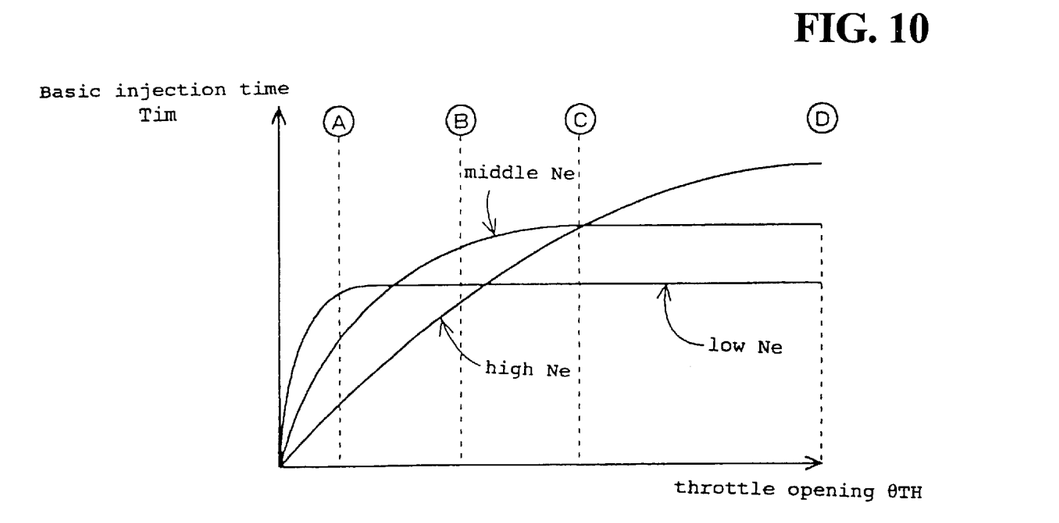
FIG. 10 is a drawing showing the relationship between the basic injection time period and the throttle opening.
Figure 11:
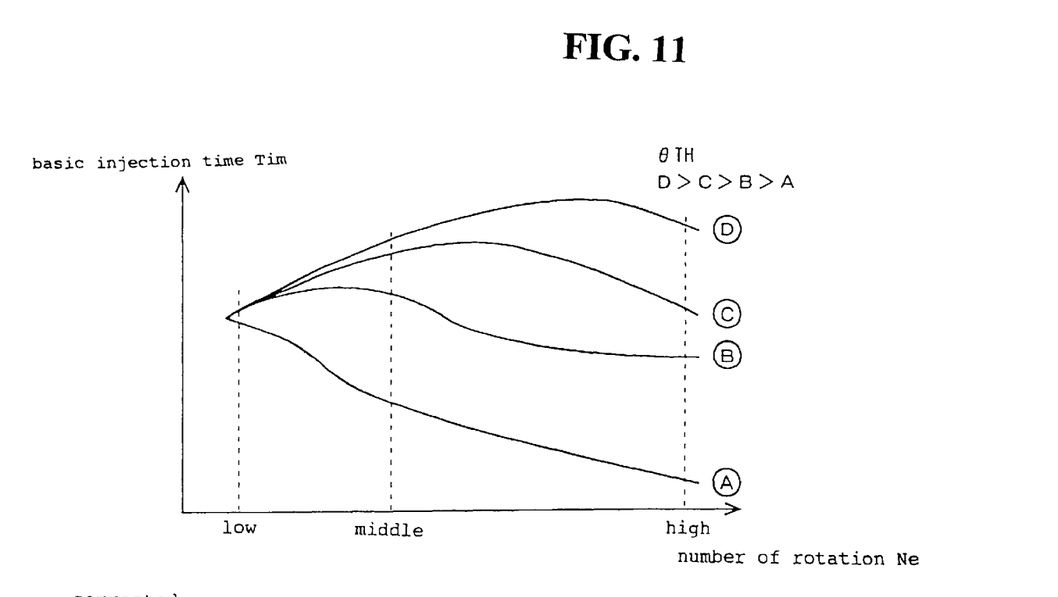
FIG. 11 is a drawing showing the relationship between the basic injection time and the number of engine revolutions.
Figure 12:
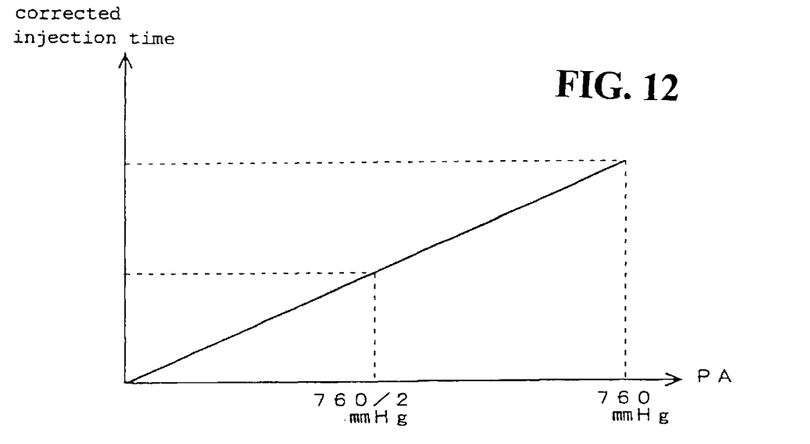
FIG. 12 is a drawing showing the relationship between the ambient pressure and the corrected injection time period.

FIG. 10 is an example of a map showing the relationship between the basic injection time period TiM and the throttle opening θTH, FIG. 11 is an example of the map showing the relationship between the basic injection time period TiM and the number of engine revolutions Ne. These maps are set for the case where the engine is operated under an air pressure of 760 mmHg, and the basic injection time period TiM is reduced in proportion to the height, or decreased in ambient pressure PA. For example, under a constant number of engine revolutions Ne and the throttle opening θTH, the relationship between the corrected injection time and the ambient pressure PA is as shown in FIG. 12.

Figure 6:
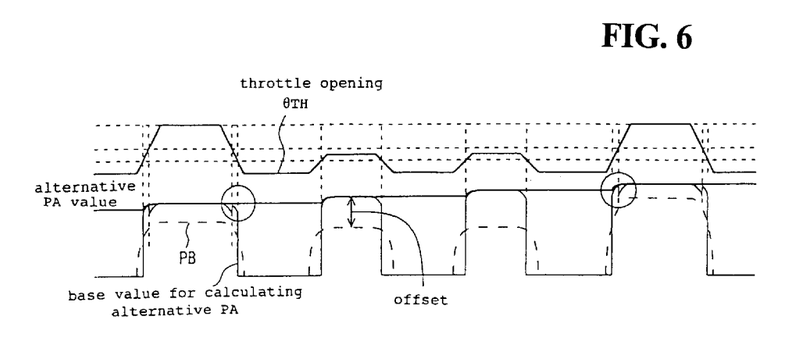
FIG. 6 is a timing chart showing the timing of renewing the alternative PA value at the time of traveling on the downslope.

Referring now to the timing chart, the calculation of the alternative PA value will be described further in detail. FIG. 6 is a timing chart showing an example of a renewal of the alternative PA value PASUB at the time of traveling on the downslope. In FIG. 6, when the throttle opening θTH is changed, the negative pressure in the inlet pipe PB changes accordingly, and thus the base value for calculating the alternative PA (PASUB_BASE) that is calculated based on the negative pressure in the inlet pipe PB is also changed. As shown in FIG. 6, the offset value is added to the negative pressure in the inlet pipe PB according to the value of the negative pressure in the inlet pipe PB and the base value for calculating the alternative PA (PASUB_BASE) is determined. Then, when the base value for calculating the alternative PA (PASUB_BASE) exceeds the alternative PA value PASUB, the alternative PA value PASUB is immediately renewed (renewed to the value higher than the current value). The discontinuity of the base value for calculating the alternative PA (PASUB_BASE) at the portion surrounded by a circle in FIG. 6 is caused by variations of the offset value in accordance with variations of the throttle opening θTH.

Figure 7:
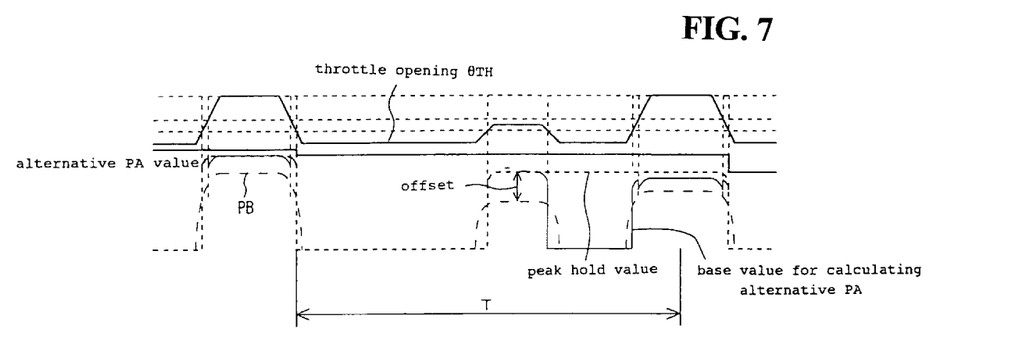
FIG. 7 is a timing chart showing the timing of renewing the alternative PA value at the time of traveling on the upslope.

FIG. 7 is a timing chart showing an example of a renewal of the alternative PA value PASUB at the time of traveling on the upslope. At the time of traveling on the upsiope, the ambient pressure PA tends to be lowered over time. Therefore, even with the same throttle opening θTH as shown in FIG. 7, the negative value in the inlet pipe PB changes over time. Therefore, when the alternative PA value (PASUB) is renewed every time when the throttle opening θTH opens to a large extent, the alternative PA value (PASUB) decreases to the value of actual ambient pressure PA. Therefore, the maximum value of the base value for calculating the alternative PA (PASUB_BASE) is stored as a peak hold value (PASUB_PHLD), and when the predetermined time T has passed, the alternative PA value (PASUB) is renewed by the peak hold value (PASUB_PHLD).

In the embodiment described above, the traveling pressure applied to the air cleaner 13 is not taken into consideration. However, in the area in which the vehicle speed (VPLS) is large, it is preferable to determine the amount of fuel injection considering the traveling pressure. Therefore, when the vehicle speed (VPLS) is larger than the predetermined value, it is desirable to take the value obtained by adding the traveling pressure to the alternative PA value (PASUB) as the ambient pressure PA. In other words, when the vehicle speed (VPLS) is large, the ambient pressure PA can be calculated by the following expression.

$$PA = \text{alternative } PA \text{ value (PASUB)} + \text{traveling pressure (PRAM)} \times (\text{alternative } PA \text{ value (PASUB)} \times 760) \quad \text{Expression 3}$$

Figure 8:
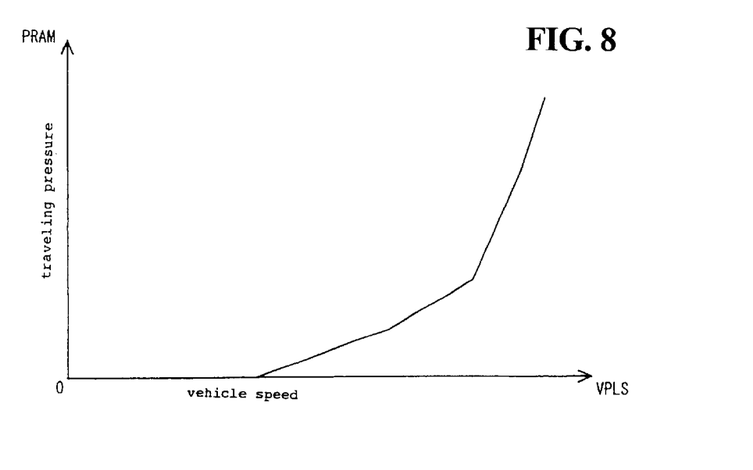
FIG. 8 is a drawing showing the relation between the vehicle speed and the traveling pressure.

In Expression 3, the traveling pressure (PRAM) is a value experimentally obtained under the predetermined 760 mmHg (ambient pressure) corresponding to the vehicle speed (VPLS). FIG. 8 is a drawing showing the relationship between the vehicle speed (VPLS) and the traveling pressure (PRAM). As shown in FIG. 8, the traveling pressure (PRAM) increases in accordance with the vehicle speed (VPLS) from the point where the vehicle speed (VPLS) exceeds a predetermined value. Such a relationship may be obtained experimentally in advance and set in advance in the storing means such as a memory.

Figure 9:
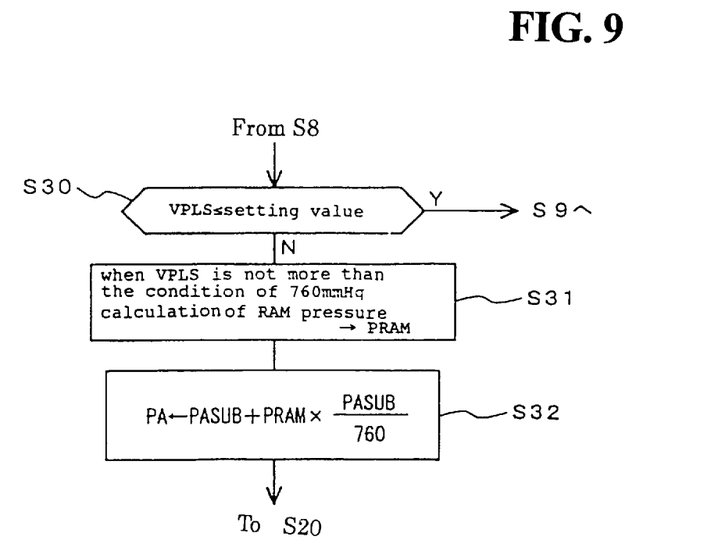
FIG. 9 is a flow chart of the process of calculating the alternative PA pressure when taking the traveling pressure into consideration.

FIG. 9 is a flow chart showing the process of calculation of the ambient pressure PA when the traveling pressure (PRAM) is taken into consideration, and executed after the step S8 in FIG. 4. In the step S30 in FIG. 9, it is determined whether or not the vehicle speed (VPLS) is not more than the prescribed value d3. While the processes from the step S9 on (FIG. 5) are executed when the determination is Yes, the procedure moves to the step S31 when the step S30 is No, and calculates the traveling pressure (PRAM) based on the vehicle speed (VPLS). The traveling pressure (PRAM) is detected from the table storing the relationship between the vehicle speed (VPLS) and the traveling pressure with the vehicle speed (VPLS) as a search key. In the step S32, the ambient pressure PA is calculated by the use of Expression 3. After the step S32, the procedure moves to the step S20.

Figure 1:
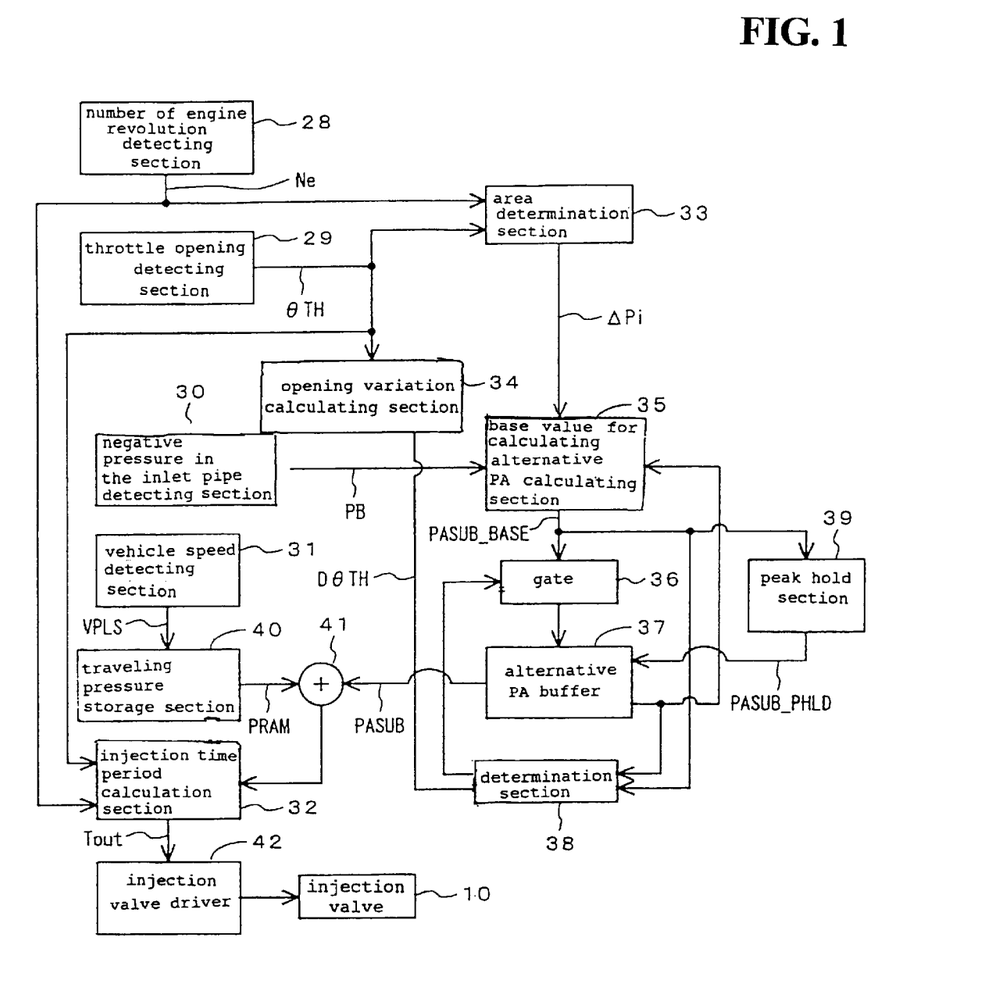
FIG. 1 is a block diagram showing the function of the principal portion of the fuel injection control apparatus according to an embodiment of the present invention.

FIG. 1 is a block diagram showing the function of the principal portion of the fuel injection control apparatus according to this embodiment. In FIG. 1, the engine revolution detecting section 28 detects the number of the revolutions of the engine Ne based on the number of the crank pulse outputted from the rotation angle sensor 19. The throttle opening detecting section 29 detects the throttle opening θTH based on the output signal of the throttle sensor 11. The negative pressure in the inlet-pipe-detecting-section 30 detects the negative pressure in the inlet pipe PB based on the output signal of the negative sensor 12. The vehicle speed detecting section 31 detects the vehicle speed (VPLS) based on the output signal of the vehicle speed sensor 21.

The injection time period calculating section 32 calculates the basic injection time period TiM based on the number of engine revolutions Ne and the throttle opening θTH, and the basic injection time period TiM is corrected by the use of the multiplication coefficient α and the addition coefficient β to calculate the injection time period Tout. The offset value that is the difference between the ambient pressure set under the reference ambient pressure and the negative pressure in the inlet pipe and a plurality of areas divided based on the offset value that are stored in the area determination section 33 as a function of the number of engine revolutions Ne and the throttle opening θTH as a function. When the number of engine revolutions Ne and the throttle opening θTH is entered, the area determination section 33 determines in which area the engine condition resides and outputs the offset value Δi defining the area.

When the opening variation detecting section 34 calculates the variation DθTH of the throttle opening θTH for every predetermined time period (interrupt time). The base value for calculating alternative PA calculating section 35 calculates the base value for calculating alternative PA (PASUB_BASE) using Expression 1 based on the negative pressure in the inlet pipe PB, the offset value Δi, and the alternative PA value (PASUB). The alternative PA value (PASUB) is set with the negative pressure in the inlet pipe PB taken as an initial value when the ignition is turned ON, and thereafter, the alternative PA value (PASUB) stored in the alternative buffer 37 is used. The base value for calculating the alternative PA (PASUB_BASE) is input into the alternative PA buffer 37 via the gate 36. The data in the alternative PA buffer 37 is renewed by the base value for calculating the alternative PA (PASUB_BASE) every time the gate 36 is opened.

The gate 36 is opened according to the result of the determination at the determination section 38. The determination section 38 outputs an instruction to open the gate 36 when the difference between the base value for calculating the alternative PA (PASUB_BASE) and the alternative PA value PASUB is smaller than the predetermined value (condition a), and when variation of the throttle opening DθTH is smaller than the predetermined value (condition b). It is also possible to contingent only on the condition a out of the conditions a and b.

The peak hold section 39 detects the peak hold value (PASUB_PHLD) of the base value for calculating the alternative PA (PASUB_BASE) within the predetermined time period after the last alternative PA value is determined, and input the peak hold value PASUB_PHLD into the buffer 37. The peak hold section 39 can be energized when the base value for calculating the alternative PA (PASUB_BASE) is larger than the last alternative PA value (PASUB).

When the vehicle speed (VPLS) is input into the traveling pressure storage section 40, in which the traveling pressure value (PRAM) is stored as a function of the vehicle speed (VPLS), it outputs the corresponding traveling pressure value (PRAM). The traveling pressure value (PRAM) is added to the alternative PA value (PASUB) read from the buffer 37 at the adding section 41, and the added result is input to the injection time calculation section 32. When the traveling pressure value (PRAM) as a function of the vehicle speed (VPLS) is set as shown in FIG. 8 for example, the alternative PA value (PASUB) of the buffer 37 is fed to the injection time period calculating section 32 until the vehicle speed (VPLS) reaches to the predetermined value.

The injection time calculating section 32 outputs the injection time period Tout, and the injection valve driver 42 determines the duty based on the injection time Tout to drive the fuel injection valve 10.

As is apparent from the description described above, according to the present invention, since the ambient pressure can be substituted by the negative pressure in the inlet pipe, the fuel injection control considering the ambient pressure can be carried out without providing the ambient pressure sensor. Especially, since the offset value is determined and the ambient pressure is calculated for every area determined according to the condition of the engine, fuel correction can be performed accurately according to the condition of the engine.

Especially, according to the present invention, since the base value for calculating the alternative ambient pressure can be renewed at the moment when the base value for calculating ambient pressure exceeds the last determined value of the ambient pressure, an accurate value of the ambient pressure can be set without missing a few chances when traveling on the downslope on which the air pressure tends to increase.

According to the present invention, since the value of the ambient pressure is renewed by the maximum value of the base value for calculating the alternative ambient pressure detected within the predetermined time period, determination of the value of the ambient pressure to a value lower than the actual value of the ambient pressure by the influence of the base value for calculating the alternative ambient pressure that tends to be lowered on the upslope is prevented.

According to the present invention, since the value of the ambient pressure is not renewed at the time of sudden change of the throttle opening that destabilizes the negative pressure in the inlet pipe, the accurate value of the ambient pressure can be obtained. Further according to the present invention, the value of the ambient pressure can be determined taking the traveling pressure into account when the vehicle speed exceeds the predetermined value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel injection control apparatus for correcting the basic injection time period calculated from the number of engine revolutions and the throttle opening by a correction expression including the value of the ambient pressure to calculate the corrected injection time period, comprising:

first detecting means for detecting a number of engine revolutions;

second detecting means for detecting a throttle opening;

third detecting means for detecting a negative pressure in an inlet pipe;

area determination means for determining the division of the area defined as a function of the number of engine revolutions and the throttle opening in which the engine condition resides out of a plurality of divisions divided based on the offset value that is the difference between the ambient pressure determined under the reference ambient pressure in advance and the negative pressure in the inlet pipe according to the number of engine revolutions and the throttle opening;

calculating means for calculating the base value for calculating the alternative ambient pressure by adding the offset value described above provided for each area determined by the area determination means to the negative pressure in the inlet pipe; and ambient pressure value determination means for determining the base value for calculating the alternative ambient pressure as a value of the ambient pressure when the difference between the last determined value of the ambient pressure and the base value for calculating the alternative ambient pressure is not more than the predetermined value.

2. The fuel injection control apparatus as set forth in claim 1, wherein said ambient pressure value determination means determines the base value for calculating said alternative ambient pressure as an ambient pressure value when the base value for calculating said alternative ambient pressure exceeds the last determined value of ambient pressure.

3. The fuel injection control apparatus as set forth in claim 2, wherein the opening variations detecting means for detecting variation of the throttle opening, and wherein said value of ambient pressure determination means is energized when said variation is within the predetermined value.

4. The fuel injection control apparatus as set forth in claim 3, wherein said reference ambient pressure is an air pressure corresponding to 760 mmHg.

5. The fuel injection control apparatus as set forth in claim 2, and further including vehicle speed detecting means, and calculating means constructed wherein when the vehicle speed detected by said vehicle speed detecting means exceeds the predetermined value, the traveling pressure value corresponding to the vehicle speed is calculated to add the ambient pressure value.

6. The fuel injection control apparatus as set forth in claim 5, and further including storage means for setting the traveling pressure value under the air pressure of 760 mmHg corresponding to the vehicle speed is provided, wherein the calculating means uses the traveling pressure value read from the storage means according to the vehicle speed.

7. The fuel injection control apparatus as set forth in claim 2, wherein said reference ambient pressure is an air pressure corresponding to 760 mmHg.

8. The fuel injection control apparatus as set forth in claim 1, wherein said value of ambient pressure determination means is constructed wherein the maximum value of the base value for calculating the alternative ambient pressure is determined within the predetermined time period from the moment when the last value of the ambient pressure is determined as the ambient pressure value.

9. The fuel injection control apparatus as set forth in claim 8, wherein the opening variations detecting means for detecting variation of the throttle opening, and wherein said value of ambient pressure determination means is energized when said variation is within the predetermined value.

10. The fuel injection control apparatus as set forth in claim 9, wherein said reference ambient pressure is an air pressure corresponding to 760 mmHg.

11. The fuel injection control apparatus as set forth in claim 8, and further including vehicle speed detecting means, and calculating means constructed wherein when the vehicle speed detected by said vehicle speed detecting means exceeds the predetermined value, the traveling pressure value corresponding to the vehicle speed is calculated to add the ambient pressure value.

12. The fuel injection control apparatus as set forth in claim 11, and further including storage means for setting the traveling pressure value under the air pressure of 760 mmHg corresponding to the vehicle speed is provided, wherein the calculating means uses the traveling pressure value read from the storage means according to the vehicle speed.

13. The fuel injection control apparatus as set forth in claim 8, wherein said reference ambient pressure is an air pressure corresponding to 760 mmHg.

14. The fuel injection control apparatus as set forth in claim 1, wherein the opening variations detecting means for detecting variation of the throttle opening, and wherein said value of ambient pressure determination means is energized when said variation is within the predetermined value.

15. The fuel injection control apparatus as set forth in claim 14, and further including vehicle speed detecting means, and calculating means constructed wherein when the vehicle speed detected by said vehicle speed detecting means exceeds the predetermined value, the traveling pressure value corresponding to the vehicle speed is calculated to add the ambient pressure value.

16. The fuel injection control apparatus as set forth in claim 15, and further including storage means for setting the traveling pressure value under the air pressure of 760 mmHg corresponding to the vehicle speed is provided, wherein the calculating means uses the traveling pressure value read from the storage means according to the vehicle speed.

17. The fuel injection control apparatus as set forth in claim 14, wherein said reference ambient pressure is an air pressure corresponding to 760 mmHg.

18. The fuel injection control apparatus as set forth in claim 1, and further including vehicle speed detecting means, and calculating means constructed wherein when the vehicle speed detected by said vehicle speed detecting means exceeds the predetermined value, the traveling pressure value corresponding to the vehicle speed is calculated to add the ambient pressure value.

19. The fuel injection control apparatus as set forth in claim 18, and further including storage means for setting the traveling pressure value under the air pressure of 760 mmHg corresponding to the vehicle speed is provided, wherein the calculating means uses the traveling pressure value read from the storage means according to the vehicle speed.

20. The fuel injection control apparatus as set forth in claim 1, wherein said reference ambient pressure is an air pressure corresponding to 760 mmHg.

* * * * *